(12) United States Patent
Baek (10) Patent No.: US 10,054,063 B2
(45) Date of Patent: Aug. 21, 2018

(54) SYSTEM FOR CONTROLLING CONTINUOUSLY VARIABLE VALVE DURATION AND OPERATING METHOD THEREOF

(71) Applicant: HYUNDAI KEFICO CORPORATION, Gunpo, Gyeonggi-do (KR)

(72) Inventor: Jin Wook Baek, Gyeonggi-do (KR)

(73) Assignee: HYUNDAI KEFICO CORPORATION, Gunpo, Gyeonggi-do (KR)

( * ) Notice: Subject to any disclaimer, the term of this patent is extended or adjusted under 35 U.S.C. 154(b) by 0 days.

(21) Appl. No.: 15/621,209

(22) Filed: Jun. 13, 2017

(65) Prior Publication Data
US 2017/0356352 A1     Dec. 14, 2017

(30) Foreign Application Priority Data

Jun. 14, 2016 (KR) ........................ 10-2016-0073760

(51) Int. Cl.
*F02D 13/02* (2006.01)
*F01L 1/344* (2006.01)
(Continued)

(52) U.S. Cl.
CPC .......... *F02D 13/0219* (2013.01); *F01L 1/344* (2013.01); *F02D 41/266* (2013.01);
(Continued)

(58) Field of Classification Search
CPC ...... F02D 11/00; F02D 13/0219; F02D 41/24; G02D 2041/001; F01L 1/344; H04L 12/413; H04L 12/6418
See application file for complete search history.

(56) References Cited

U.S. PATENT DOCUMENTS 5,422,553 A *  6/1995  MacLennan ......... G05B 23/027
                                                       318/565
9,062,572 B2 *  6/2015  Kameda .............. F01L 1/34409
(Continued)

FOREIGN PATENT DOCUMENTS

JP     2003-065131 A    3/2003
JP     2010-048190 A    3/2010
(Continued)

*Primary Examiner* — Bentsu Ro
(74) *Attorney, Agent, or Firm* — Mintz Levin Cohn Ferris Glovsky and Popeo, P.C.; Kongsik Kim; Jhongwoo Jay Peck (57) ABSTRACT

A system for controlling a CVVD by adjusting an actuator for controlling the CVVD is provided. The system includes an electronic control unit (ECU) configured to output a command phase angle and a selection signal for controlling the actuator based on a vehicle state and a mode of operation, and an actuator controller configured to operate based on the command phase angle and the selection signal and output an electric current to adjust the actuator. The actuator controller is configured to output an electric current corresponding to the command phase angle originating from the ECU or adjust the command phase angle and then output an electric current corresponding to the corrected command phase angle based on a type of selection signal.

12 Claims, 4 Drawing Sheets

(51) Int. Cl.
   *H04L 12/413*   (2006.01)
   *H04L 12/64*   (2006.01)
   *F02D 41/26*   (2006.01)
   *F02D 41/00*   (2006.01)
   *F02D 41/22*   (2006.01)
   *F02D 41/20*   (2006.01)

(52) U.S. Cl.
   CPC ........ *H04L 12/413* (2013.01); *H04L 12/6418* (2013.01); *F02D 41/22* (2013.01); *F02D 2041/001* (2013.01); *F02D 2041/2027* (2013.01)

(56) References Cited

U.S. PATENT DOCUMENTS

| | | | |
|---|---|---|---|
| 9,494,058 B2* | 11/2016 | Kameda | F01L 1/34409 |
| 2004/0237916 A1* | 12/2004 | Takahashi | F02D 13/0219 |
| | | | 123/90.15 |
| 2008/0189022 A1* | 8/2008 | Watanabe | F01L 1/3442 |
| | | | 701/101 |
| 2009/0037085 A1* | 2/2009 | Kojima | F02N 11/0844 |
| | | | 701/113 |
| 2010/0242880 A1* | 9/2010 | Watanabe | F01L 1/344 |
| | | | 123/90.17 |
| 2013/0206089 A1* | 8/2013 | Kameda | F01L 1/34409 |
| | | | 123/90.17 |
| 2014/0034025 A1* | 2/2014 | Nishimura | F02M 69/04 |
| | | | 123/478 |
| 2016/0153324 A1 | 6/2016 | Kwon et al. | |
| 2016/0252022 A1* | 9/2016 | Shinozaki | F02D 15/02 |
| | | | 123/48 B |
| 2017/0074179 A1* | 3/2017 | Mikawa | F02D 41/26 |

FOREIGN PATENT DOCUMENTS

| | | |
|---|---|---|
| JP | 4805893 B2 | 11/2011 |
| KR | 10-1484239 B1 | 1/2015 |
| KR | 2016-0064847 A | 6/2016 |

\* cited by examiner

SYSTEM FOR CONTROLLING CONTINUOUSLY VARIABLE VALVE DURATION AND OPERATING METHOD THEREOF

CROSS-REFERENCE TO RELATED APPLICATION

This application claims priority to and the benefit of Korean Patent Application No. 10-2016-0073760, filed on Jun. 14, 2016, the disclosure of which is incorporated herein by reference in its entirety.

BACKGROUND

1. Field of the Disclosure

The present disclosure relates to control of a continuously variable valve duration (CVVD), and more particularly, to a system for controlling a CVVD, to provide more stable control of an actuator to adjust a CVVD, and an operating method thereof.

2. Description of the Related Art

Generally, an internal combustion engine is configured to generate power by receiving and burning fuel and air in a combustion chamber. When air is suctioned, an intake valve is actuated by a camshaft being driven, and the air is suctioned into a combustion chamber while the intake valve is open. Additionally, an exhaust valve is actuated when the camshaft is driven and the air is discharged from the combustion chamber while the exhaust valve is open. However, an optimal operation for the intake value or exhaust valve changes based on a rotational speed of an engine. In other words, valve-opening or closing timing changes according to the rotational speed of the engine.

In order to optimize the valve operation according to the rotational speed of the engine, research has been conducted on a continuously variable valve lift (CVVL) apparatus configured to design a plurality of cams to drive a valve or operate the valve by using different lifts based on the number of revolutions of an engine. Continuously variable valve timing (CVVT) technology has been developed to adjust an opening timing of the valve. For example, a valve opening timing and a valve closing timing are simultaneously adjusted while a valve duration is fixed. A conventional CVVL or CVVT apparatus has problems in terms of a complex configuration and a high cost.

Thus, research and development have been conducted on a continuously variable valve duration (CVVD) apparatus that may adjust a valve duration using a simple configuration to enhance fuel efficiency and performance of an engine. A CVVD apparatus includes an actuator for selectively varying a rotational center position of a cam and an actuator controller for adjusting the actuator. The actuator controller adjusts the actuator according to a command received from an electronic control unit (ECU). When an abnormality occurs in the actuator controller, it is impossible to guarantee normal control of the actuator and achieve accurate control of a CVVD.

The above information disclosed in this section is merely for enhancement of understanding of the background of the disclosure and therefore it may contain information that does not form the prior art that is already known in this country to a person of ordinary skill in the art.

SUMMARY

A system for controlling a continuously variable valve duration (CVVD) is provided. The system provides more stable control of an actuator to adjust a CVVD, and an operating method thereof.

According to an aspect of the present disclosure, a system for controlling a CVVD by adjusting an actuator for controlling the CVVD may include the system an electronic control unit (ECU) configured to output a command phase angle and a selection signal to adjust the actuator based on a vehicle state and a mode; and an actuator controller configured to operate on the basis of the command phase angle and the selection signal and output an electric current to adjust the actuator. The actuator controller may be configured to output an electric current corresponding to the command phase angle originating from the ECU or adjust the command phase angle and then output an electric current corresponding to the corrected command phase angle based on a type of selection signal.

The ECU may include a command generation unit configured to output a target phase angle as the command phase angle based on the vehicle state, output a target phase angle selection signal as the selection signal in a normal mode, and output a calculative phase angle selection signal as the selection signal in an abnormal mode. A first proportional-integral-derivative (PID) control unit may be configured to generate a calculative phase angle, obtained by adjusting the target phase angle based on a phase deviation between the target phase angle output from the command generation unit and an actual phase angle received from the actuator, and output the calculative phase angle as the command phase angle. The command generation unit may be configured to determine the abnormal mode when an abnormality occurrence signal is received from the actuator controller.

The actuator controller may include a demultiplexer configured to output a received command phase angle through different paths based on the provided selection signal; a second PID control unit may be configured to generate and output a calculative phase angle obtained by adjusting a target phase angle output by the demultiplexer on the basis of a phase deviation between the target phase angle and the actual phase angle received from the actuator; a pulse width modulation (PWM) generation unit configured to generate a PWM signal corresponding to the command phase angle originating from the demultiplexer or a PWM signal corresponding to the calculative phase angle originating from the second PID control unit. A driver may be configured to output an electric current corresponding to the PWM signal to the actuator.

The demultiplexer may be configured to provide the command phase angle to the second PID control unit when the selection signal is the target phase angle selection signal and provide the command phase angle to the PWM generation unit when the selection signal is the calculative phase angle selection signal.

According to another aspect of the present disclosure, an operating method of a system for controlling a CVVD by adjusting an actuator for controlling the CVVD may include outputting a command phase angle and a selection signal for adjusting the actuator based on a vehicle state and a mode; generating a PWM signal corresponding to the command phase angle or adjusting the command phase angle and then generating a PWM signal corresponding to the corrected command phase angle based on a type of selection signal; and outputting an electric current corresponding to the generated PWM signal to the actuator to control the CVVD.

The outputting may include outputting a target phase angle as the command phase angle and outputting a target phase angle selection signal as the selection signal in a normal mode; and outputting a calculative phase angle, obtained by adjusting the target phase angle, as the command phase angle and outputting a calculative phase angle selection signal as the selection signal in an abnormal mode. In the outputting, the calculative phase angle may be generated by adjusting the target phase angle on the basis of a phase deviation between the target phase angle and an actual phase angle received from the actuator.

The generating of a PWM signal may include generating a PWM signal corresponding the calculative phase angle generated by adjusting the target phase angle on the basis of a phase deviation between the target phase angle and an actual phase angle received from the actuator when the selection signal is the target phase angle selection signal and generating a PWM signal corresponding to the calculative phase angle output g when the selection signal is the calculative phase angle selection signal.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION

Various example embodiments will now be described more fully with reference to the accompanying drawings in which only some example embodiments are shown. Specific structural and functional details disclosed herein are merely representative for the purpose of describing example embodiments. However, the present disclosure may be embodied in many alternate forms and is not to be construed as being limited to only the example embodiments set forth herein.

Accordingly, while example embodiments of the disclosure are capable of various modifications and alternative forms, embodiments thereof are shown by way of example in the drawings and will herein be described in detail. However, it should be understood that there is no intent to limit example embodiments of the present disclosure to the particular forms disclosed. Conversely, example embodiments are to cover all modifications, equivalents, and alternatives falling within the scope of the disclosure.

It should be understood that, although the terms first, second, etc. may be used herein to describe various elements, these elements are not limited by these terms. These terms are only used to distinguish one element from another. For example, a first element could be termed a second element, and, similarly, a second element could be termed a first element, without departing from the scope of example embodiments of the present disclosure.

It should be understood that when an element is referred to as being "connected" or "coupled" to another element, the element can be directly connected or coupled to the other element or intervening elements may be present. Conversely, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, in order to make the description of the present invention clear, unrelated parts are not shown and, the thicknesses of layers and regions are exaggerated for clarity. Further, when it is stated that a layer is "on" another layer or substrate, the layer may be directly on another layer or substrate or a third layer may be disposed therebetween. It should also be noted that in some alternative implementations, functions/acts noted in a specific block may occur out of the order noted in a flowchart. For example, two blocks shown in succession may in fact be executed substantially concurrently or may sometimes be executed in a reverse order depending upon functionality/acts involved. Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

It is understood that the term "vehicle" or "vehicular" or other similar term as used herein is inclusive of motor vehicle in general such as passenger automobiles including sports utility vehicles (SUV), buses, trucks, various commercial vehicles, watercraft including a variety of boats, ships, aircraft, and the like and includes hybrid vehicles, electric vehicles, combustion, plug-in hybrid electric vehicles, hydrogen-powered vehicles and other alternative fuel vehicles (e.g. fuels derived from resources other than petroleum).

Figure 1:
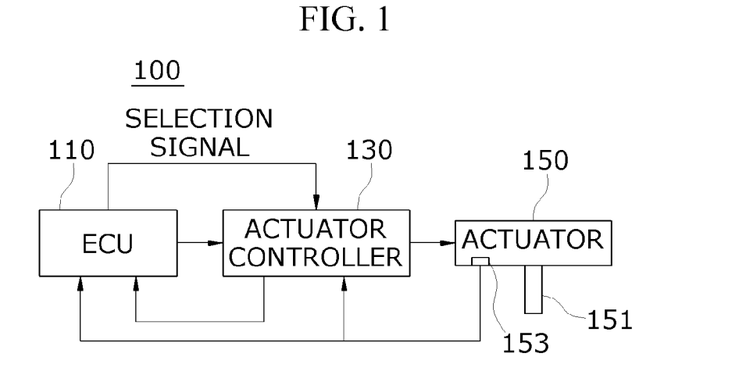
FIG. 1 is an exemplary diagram showing a configuration of a system for controlling a continuously variable valve duration (CVDD) according to an exemplary embodiment of the present disclosure.
Figure 2:
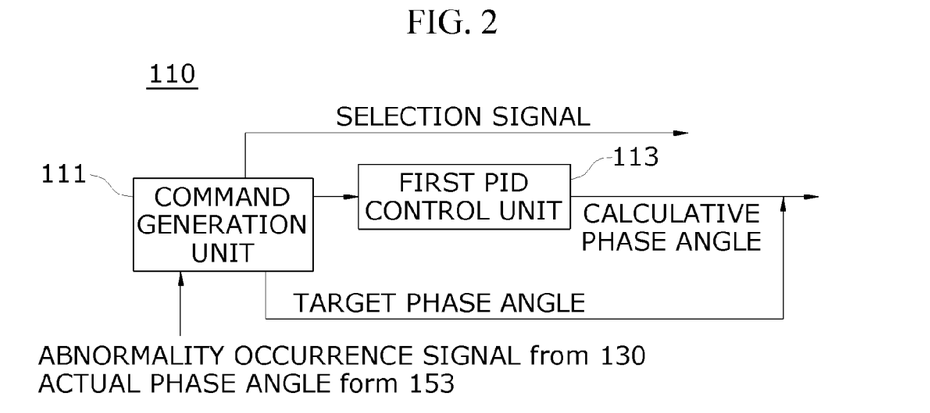
FIG. 2 is an exemplary diagram showing a configuration of an electronic control unit (ECU) of the system for controlling a CVVD shown in FIG. 1.
Figure 3:
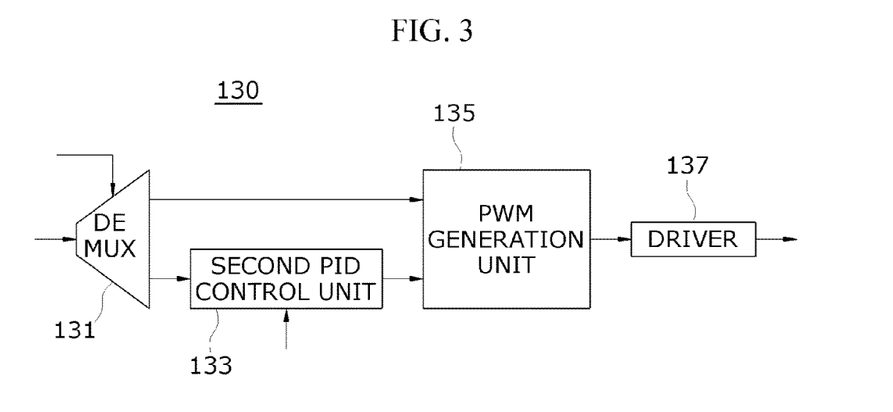
FIG. 3 is an exemplary diagram showing a configuration of an actuator controller of the CVVD control system shown in FIG. 1.

Hereinafter, a system for controlling a continuously variable valve duration (CVVD) and an operating method thereof according to an exemplary embodiment of the present disclosure will be described in detail with reference to the accompanying drawings. FIG. 1 is an exemplary diagram showing a configuration of a system for adjusting a CVVD according to an exemplary embodiment of the present disclosure. FIG. 2 is an exemplary diagram showing a configuration of an electronic control unit (ECU) of the system for controlling a CVVD shown in FIG. 1. FIG. 3 is an exemplary diagram showing a configuration of an actuator controller of the system for controlling a CVVD shown in FIG. 1.

Referring to FIGS. 1 to 3, the system for adjusting a CVVD according to an exemplary embodiment of the present disclosure (hereinafter referred to as a "system 100") may include an ECU 110, an actuator controller 130, and an actuator 150. The system 100 may be configured to adjust a duration of a continuously variable valve and may implement a long duration or a short duration for the continuously variable valve (hereinafter referred to as a "valve") under control of the system 100. In particular, the system 100 may be implemented in a dual form to more stably control the actuator 150.

The ECU 110 may be configured to communicate with the actuator controller 130 through a vehicle network communication method such as controller area network (CAN) communication and may appropriately provide a command for adjusting a valve to the actuator controller 130 according to a vehicle state such as the number of revolutions of an engine, a load state of a vehicle, etc. In other words, the command provided by the ECU 110 may be for a phase angle, which may be a target phase angle or a calculative phase angle. Hereinafter, the target phase angle and the calculative phase angle are collectively referred to as a "command phase angle."

The target phase angle may be a phase angle that is predetermined according to a vehicle state to control a valve, and the calculative phase angle may be a phase angle that is generated on the basis of a calculated phase deviation between the target phase angle and an actual phase angle. The actual phase angle may be a current phase angle of a control shaft 151 that is received from the actuator 150. In addition, the ECU 110 may be configured to provide a selection signal to the actuator controller 130 together with the command phase angle. The selection signal may be a control signal for determining the next operation of the actuator controller 130 when the command phase angle is received. The ECU 110 may provide a command phase angle and a selection signal that match each other to the actuator controller 130.

Hereinafter, a selection signal for selecting the target phase angle may be referred to as a "target phase angle selection signal," and a selection signal for selecting the calculative phase angle may be referred to as a "calculative phase angle selection signal." For example, the ECU 110 may provide a target phase angle to the actuator controller 130 as the command phase angle and provide a logic "0" to the actuator controller 130 as the selection signal. Additionally, the ECU 110 may provide a calculative phase angle to the actuator controller 130 as the command phase angle and provide a logic "1" to the actuator controller 130 as the selection signal. In particular, depending on modes, the ECU 110 may provide the target phase angle and the target phase angle selection signal to the actuator controller 130 or may provide the calculative phase angle and the calculative phase angle selection signal to the actuator controller 130.

For convenience of description, it is assumed that the ECU provides the target phase angle and the target phase angle selection signal to the actuator controller 130 in a normal mode and provides the calculative phase angle and the calculative phase angle selection signal to the actuator controller 130 in an abnormal mode. As shown in FIG. 2, the ECU 110 may include a command generation unit 111 and a first proportional-integral-derivative (PID) control unit 113. The command generation unit 111 may be configured to perform different operations depending on modes. When a current mode is the normal mode, the command generation unit 111 may be configured to output the target phase angle and the target phase angle selection signal. Then, the output target phase angle and target phase angle selection signal may be provided to the actuator controller 130.

Additionally, when the current mode is the abnormal mode, the command generation unit 111 may be configured to output the target phase angle and the calculative phase angle selection signal. Then, the output target phase angle may be provided to the first PID control unit 113 and the output calculative phase angle selection signal may be provided to the actuator controller 130. In other words, the command generation unit 111 may be configured to determine whether to operate in the normal mode or in the abnormal mode based on a state of the actuator controller 130. In particular, the command generation unit 111 may be configured to determine the mode on the basis of whether an abnormality occurrence signal is transmitted by the actuator controller 130. The command generation unit 111 may be configured to operate in the abnormal mode when the abnormality occurrence signal is received from the actuator controller 130.

When the target phase angle provided by the command generation unit 111 is received, the first PID control unit 113 may be configured to calculate a phase deviation between an actual phase angle received from the actuator 150 and the target phase angle and may be configured to generate and output the calculative phase angle obtained by adjusting the target phase angle on the basis of the calculated phase deviation. The actuator controller 130 may be configured to receive the command phase angle and the selection signal provided by the ECU 110 and outputs an electric current corresponding to the command phase angle to control the actuator 150.

As shown in FIG. 3, the actuator controller 130 may include a demultiplexer 131, a second PID control unit 133, a pulse width modulation (PWM) generation unit 135, and a driver 137. The demultiplexer 131 may be configured to select one of several outputs. According to the present disclosure, the demultiplexer 131 may be configured to select one of the second PID control unit 133 and the PWM generation unit 135. In other words, the demultiplexer 131 may be configured to receive the command phase angle and the selection signal provided from the ECU 110 and provides the command phase angle to the second PID control unit 133 or to the PWM generation unit 135 based on the selection signal. In this case, when the selection signal is the target phase angle selection signal, the demultiplexer 131 may be configured to provide the command phase angle to the second PID control unit 133. Additionally, when the selection unit is the calculative phase angle selection signal, the demultiplexer 131 may be configured to provide the command phase angle to the PWM generation unit 135.

Accordingly, the demultiplexer 131 may be configured to provide the target phase angle to the first PID control unit 133 and provide the calculative phase angle to the PWM generation unit 135. When the target phase angle provided by the demultiplexer 131 is received, the second PID control unit may be configured to calculate a phase deviation between an actual phase angle received from the actuator 150 and the target phase angle and may be configured to generate and output the calculative phase angle obtained by adjusting the target phase angle on the basis of the calculated phase deviation.

The PWM generation unit 135 may be configured to generate a PWM signal corresponding to the provided calculative phase angle and provides the generated PWM signal to the driver 137. The driver 137 may be configured to output an electric current corresponding to the PWM signal provided by the PWM generation unit 135 to the actuator 150. Details regarding the generation of the PWM signal according to the input calculative phase angle and the output of the electric current corresponding to the generated PWM signal are well-known to those skilled in the art, and thus a detailed description thereof will be omitted.

Additionally, when the occurrence of an abnormality is detected through self-examination, the actuator controller 130 according to the present disclosure may be configured to provide the abnormality occurrence signal to the ECU 110. In particular, the self-examination of the actuator controller 130 may be configured to be performed by one of the above-described components of the actuator controller 130. for example, the second PID control unit 133, and may also be performed by other components. For example, the second PID control unit 133 may be configured to receive a feedback value of its own output value, determine whether the output value is the same as the feedback value, and determine that an abnormality has occurred when the output value is not the same as the feedback value. However, the self-examination method of the actuator controller 130 is not limited thereto.

The actuator 150 may be configured to operate based on the electric current output by the actuator controller 130 to adjust a duration of a continuously variable valve. In other words, the control shaft 151 cooperating with a camshaft (not shown) may be disposed in the actuator 150 to adjust the continuously variable valve, and the actuator 150 adjusts the duration of the continuously variable valve by controlling a phase angle of the control shaft 151. Further, a phase angle detection unit 153 for detecting the phase angle of the control shaft 151 may be disposed in the actuator 150, and the phase angle detection unit 153 may be configured to detect the phase angle of the control shaft 151 and provides the detected phase angle to the ECU 110 and the actuator controller 130.

The configuration of the system for controlling a CVVD according to an exemplary embodiment of the present disclosure has been described above. An operation of the system for controlling a CVVD according to an exemplary embodiment of the present disclosure will be described in detail below with reference to the accompanying drawings.

Figure 4:
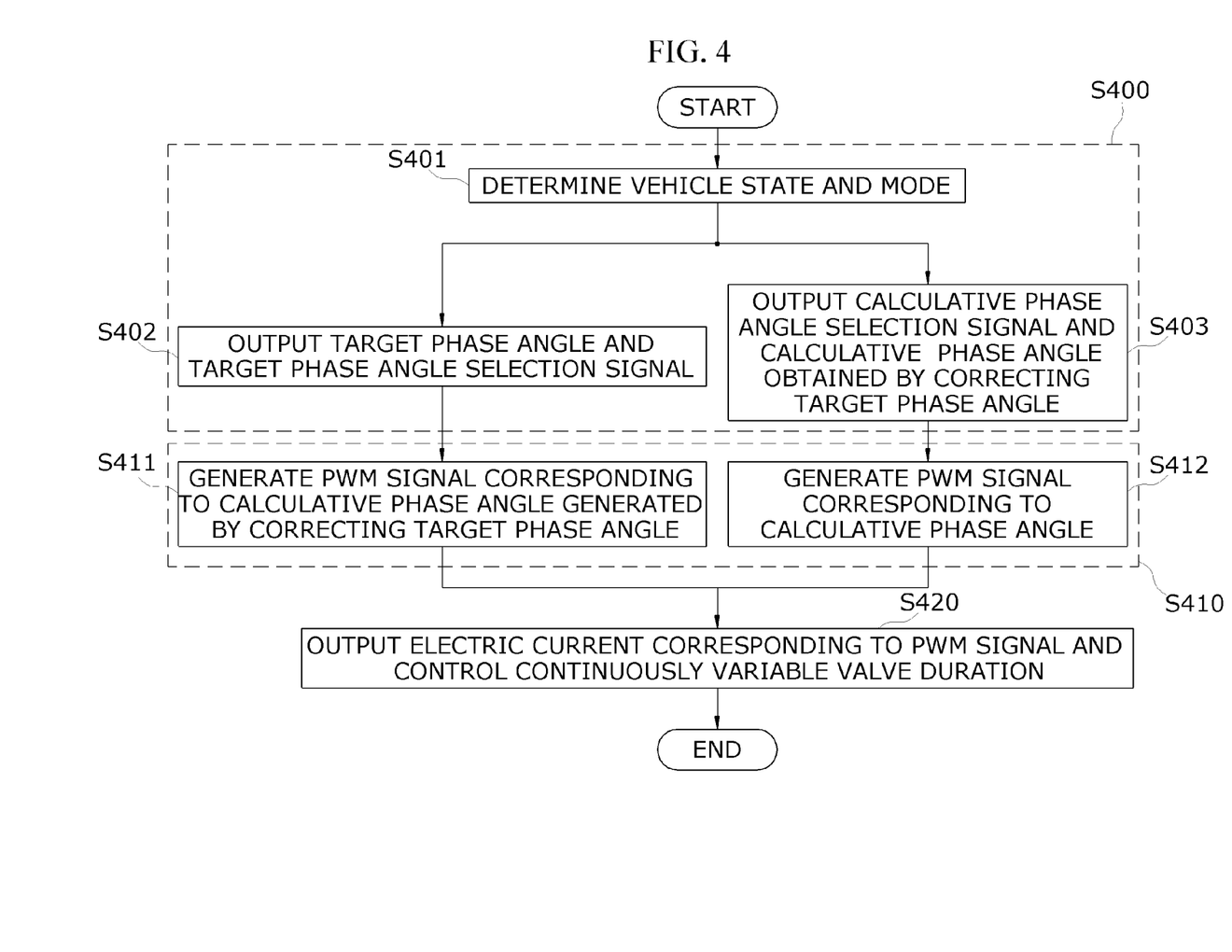
FIG. 4 is an exemplary flowchart showing an operational sequence of the system for controlling a CVVD according to an exemplary embodiment of the present disclosure.

FIG. 4 is an exemplary flowchart showing an operational sequence of the system for controlling a CVVD according to an exemplary embodiment of the present disclosure. First, when the system 100 is operated, the ECU 110 may be configured to output a command phase angle and a selection signal to the actuator controller 130 according to a vehicle state and a mode. Specifically, in S400, the ECU 110 may be configured to determine the vehicle state and the mode (S401). When the mode is a normal mode, the ECU 110 may be configured to output a target phase angle as the command phase angle and outputs a target phase angle selection signal as the selection signal (S402). Additionally, when the mode is an abnormal mode, the ECU 110 generates a calculative phase angle obtained by adjusting the target phase angle on the basis of a phase deviation between the target phase angle and an actual phase angle received from the actuator 150, output the calculative phase angle as the command phase angle, and outputs a calculative phase angle selection signal as the selection signal (S403).

In particular, in S401, the ECU 110 may be configured to determine whether the current mode is the normal mode or the abnormal mode based on whether an abnormality occurrence signal is received from the actuator controller 130. In other words, the ECU 110 may be configured to determine that the current mode is the abnormal mode when the abnormality occurrence signal is transmitted by the actuator controller 130 and determines that the current mode is the normal mode when the abnormality occurrence signal is not transmitted by the actuator controller 130.

The command phase angle (e.g., the target phase angle or the calculative phase angle) and the selection signal (e.g., the target phase angle selection signal or the calculative phase angle selection signal) that may be output in S400 are provided to the actuator controller 130. The actuator controller 130 may be configured to generate a PWM signal based on the target phase angle and the selection signal (S410). Specifically, in step 410, when the target phase angle and the target phase angle selection signal are received, the actuator controller 130 may be configured to calculate a phase deviation between the target phase angle and an actual phase angle received from the actuator 150, may be configured to generate a calculative phase angle obtained by adjusting the target phase angle on the basis of the calculated phase deviation, and may be configured to generate a PWM signal corresponding to the generated calculative phase angle (S411).

Additionally, in S410, when the calculative phase angle and the calculative phase angle selection signal are received, the actuator controller 130 may be configured to generate a PWM signal corresponding to the received calculative phase angle (S412). After S410, the actuator controller 130 may be configured to output an electric current corresponding to the generated PWM signal to the actuator 150 to control a CVVD (S420). According to the configuration of the system according to an exemplary embodiment of the present disclosure, it is possible for both an ECU and an actuator controller to control an actuator for controlling a CVVD. Accordingly, more stable control of the actuator because the ECU may control the actuator when an abnormality occurs in the actuator controller may be provided.

Even though all of the components of the above-described exemplary embodiment of the present disclosure may be combined as one component or operate in combination, the disclosure is not limited to the embodiment. In other words, all of the components may be selectively combined as one or more components to operate within the scope of the disclosure. Also, each component may be implemented with one independent hardware device, but some or all of the components may be selectively combined and implemented as a computer program having a program module for performing some or all functions combined in one or more hardware devices. Further, such a computer program may be stored in a computer-readable recording medium such as a universal serial bus (USB) memory, a compact disc (CD), a flash memory, or the like. The embodiment of the present disclosure may be implemented by reading and executing the computer program. Examples of the computer-readable recording medium may include a magnetic recording medium, an optical recording medium, a carrier wave medium, and the like.

The system for controlling a CVVD and the operating method thereof according to the present disclosure have been described with reference to exemplary embodiments. However, the present disclosure is not limited to the exemplary embodiment, and it should be apparent to those skilled in the art that various alternatives, modifications, and variations can be made therein without departing from the spirit and scope of the present disclosure.

Accordingly, the exemplary embodiment and the accompany drawings of the present disclosure are to be considered descriptive and not restrictive of the disclosure, and do not limit the technical scope of the disclosure. The scope of the disclosure should be construed by the appended claims, and all technical ideas within the scope of their equivalents should be construed as being included in the scope of the disclosure.

What is claimed is:

1. A system for controlling a continuously variable valve duration (CVVD) by adjusting an actuator for controlling the CVVD, the system comprising:
   an electronic control unit (ECU) configured to output a command phase angle and a selection signal to adjust the actuator according to a vehicle state and a mode; and
   an actuator controller configured to receive the command phase angle and the selection signal from the ECU and output an electric current to adjust the actuator,
   wherein the actuator controller is configured to output an electric current corresponding to the command phase angle or to adjust the command phase angle and then output an electric current corresponding to the adjusted command phase angle based on the selection signal.

2. The system of claim 1, wherein the ECU comprises:
   a command generation unit configured to output a target phase angle as the command phase angle based on the vehicle state, output a target phase angle selection signal as the selection signal in a normal mode, and output a calculative phase angle selection signal as the selection signal in an abnormal mode; and
   a first proportional-integral-derivative (PID) control unit configured to generate a calculative phase angle, obtained by adjusting the target phase angle based on a phase deviation between the target phase angle output from the command generation unit and an actual phase angle received from the actuator, and output the calculative phase angle as the command phase angle.

3. The system of claim 2, wherein the command generation unit is configured to determine the abnormal mode when an abnormality occurrence signal is received from the actuator controller.

4. The system of claim 2, wherein the actuator controller comprises:
   a demultiplexer configured to output a received command phase angle through different paths based on the provided selection signal;
   a second PID control unit configured to generate and output a calculative phase angle obtained by adjusting a target phase angle output by the demultiplexer based on a phase deviation between the target phase angle and the actual phase angle received from the actuator;
   a pulse width modulation (PWM) generation unit configured to generate a PWM signal corresponding to the command phase angle originating from the demultiplexer or a PWM signal corresponding to the calculative phase angle originating from the second PID control unit; and
   a driver configured to output an electric current corresponding to the PWM signal to the actuator.

5. The system of claim 4, wherein the demultiplexer is configured to provide the command phase angle to the second PID control unit when the selection signal is the target phase angle selection signal and provide the command phase angle to the PWM generation unit when the selection signal is the calculative phase angle selection signal.

6. An operating method of a system for controlling a CVVD by controlling an actuator for controlling the CVVD, the operating method comprising:
   outputting, by a controller, a command phase angle and a selection signal to adjust the actuator based on a vehicle state and a mode of operation;
   demultiplexing the command phase angle, by the controller, to select between generating a PWM signal corresponding to the command phase angle or adjusting the command phase angle and then generating a PWM signal corresponding to an adjusted command phase angle depending on the selection signal; and
   outputting, by the controller, an electric current corresponding to the generated PWM signal to the actuator to control the CVVD.

7. The operating method of claim 6, wherein the outputting comprises:
   outputting, by the controller, a target phase angle as the command phase angle and outputting a target phase angle selection signal as the selection signal in a normal mode; and
   outputting, by the controller, a calculative phase angle, determined by adjusting the target phase angle, as the command phase angle and outputting a calculative phase angle selection signal as the selection signal in an abnormal mode.

8. The operating method of claim 7, wherein in the outputting, the calculative phase angle is generated by adjusting the target phase angle based on a phase deviation between the target phase angle and an actual phase angle received from the actuator.

9. The operating method of claim 7, wherein the generating of a PWM signal comprises:
   generating a PWM signal corresponding the calculative phase angle determined by adjusting the target phase angle on the basis of a phase deviation between the target phase angle and an actual phase angle received from the actuator when the selection signal is the target phase angle selection signal; and
   generating a PWM signal corresponding to the calculative phase angle output in the outputting when the selection signal is the calculative phase angle selection signal.

10. A system for controlling a continuously variable valve duration (CVVD) by adjusting an actuator for controlling the CVVD, the system comprising:
   an electronic control unit (ECU) configured to output a command phase angle and a selection signal to adjust the actuator according to a vehicle state and a mode; and
   an actuator controller configured to operate based on the command phase angle and the selection signal and output an electric current to adjust the actuator, wherein the actuator controller is configured to output an electric current corresponding to the command phase angle originating from the ECU or to adjust the command phase angle and then output an electric current corresponding to the adjusted command phase angle based on a type of selection signal,
   wherein the ECU comprises:
   a command generation unit configured to output a target phase angle as the command phase angle based on the vehicle state, output a target phase angle selection signal as the selection signal in a normal mode, and output a calculative phase angle selection signal as the selection signal in an abnormal mode; and a first proportional-integral-derivative (PID) control unit configured to generate a calculative phase angle, obtained by adjusting the target phase angle based on a phase deviation between the target phase angle output from the command generation unit and an actual phase angle received from the actuator, and output the calculative phase angle as the command phase angle;

wherein the actuator controller comprises:

a demultiplexer configured to output a received command phase angle through different paths based on the provided selection signal;

a second PID control unit configured to generate and output a calculative phase angle obtained by adjusting a target phase angle output by the demultiplexer based on a phase deviation between the target phase angle and the actual phase angle received from the actuator;

a pulse width modulation (PWM) generation unit configured to generate a PWM signal corresponding to the command phase angle originating from the demultiplexer or a PWM signal corresponding to the calculative phase angle originating from the second PID control unit; and a driver configured to output an electric current corresponding to the PWM signal to the actuator.

11. The system of claim 10, wherein the command generation unit is configured to determine the abnormal mode when an abnormality occurrence signal is received from the actuator controller.

12. The system of claim 10, wherein the demultiplexer is configured to provide the command phase angle to the second PID control unit when the selection signal is the target phase angle selection signal and provide the command phase angle to the PWM generation unit when the selection signal is the calculative phase angle selection signal.

* * * * *